UNITED STATES PATENT OFFICE.

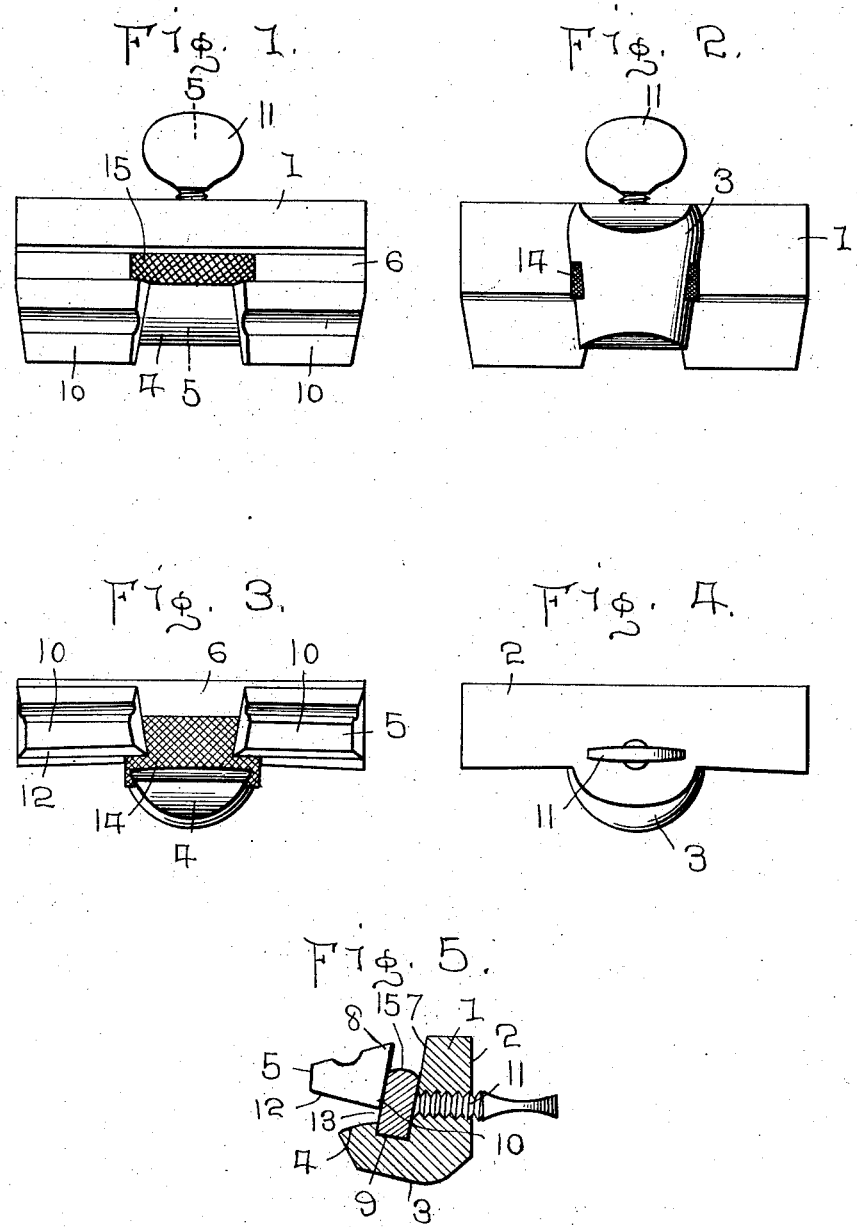

GEORGE W. GILLESPIE, OF SEATTLE, WASHINGTON.

COMBINATION ICE-SKATE AND LAWN-MOWER SHARPENER.

1,025,393. Specification of Letters Patent. Patented May 7, 1912.

Application filed March 2, 1911. Serial No. 611,800.

*To all whom it may concern:*

Be it known that I, GEORGE W. GILLESPIE, a citizen of the United States, residing at Seattle, in the county of Kings and State of Washington, have invented certain new and useful Improvements in Combination Ice-Skate and Lawn-Mower Sharpeners; and I do hereby declare the following to be a full, clear, and exact description of the invention, such as will enable others skilled in the art to which it appertains to make and use the same.

This invention relates to sharpeners and more particularly to sharpening devices adapted to sharpen either ice skates or lawn mower blades.

The object of the invention is to provide a combination sharpening tool comprising a holder having a file removably secured therein, said holder being also provided with two guiding passages positioned at about right angles to one another, said guiding passages being adapted to guide blades of various characters to the file and prevent slipping of the tool or of the blade being sharpened during the operation of the device.

Other objects and advantages will be hereinafter set forth and pointed out in the specification and claim.

In the accompanying drawings which are made a part of this application, Figure 1 is a side elevational view of the sharpening device, Fig. 2 is a view of the opposite side, Fig. 3 is a view of a third side of the device, showing the guide passage for the lawn mower blade or other cutting edge, Fig. 4 is a view of the back of the implement, and Fig. 5 is a cross sectional view on the line 5—5 of Fig. 1.

Referring more particularly to the drawings in which similar reference numerals designate corresponding parts throughout the several views, 1 represents the holder having the smoothed backside 2 and the curved offset portion 3, which latter extends forwardly beyond the main portion of the device and has the guide wall 4 which is slightly curved and the purpose of which will be later fully stated.

About midway between the sides 2 and 5, the holder is provided with the longitudinally extending guide passage 6 having the continuous slanting wall 7 extending from end to end of the device and the slanting walls 8 opposite the wall 7, said walls 8 constituting the adjacent walls of the wings 10.

The wings 10 extend from the opposite ends of the tool to within a short distance of one another, the facing ends being beveled, as clearly shown, to enable the user to readily insert or withdraw the file, as will be later fully understood.

The offset portion 3 is provided with a groove 9 in alinement with the guiding passage 6, said groove 9 being adapted to co-act with the central portion of the guiding passage 6, with which the groove connects, to hold a file 15 and present the same to the upper portion of the passage 6 and also to the guiding passage 13 in the side at right angles to the side within which the guiding passage 6 is located, both guiding passages extending longitudinally of the device.

The guiding passage 13, which is especially adapted for guiding blades such as lawn mower blades to the file 15, is formed by the slanting guiding wall 4 of the offset portion 3 and the adjacent slanting sides 12 of the wings 10, it being understood that the inner ends of the wings 10 and the edges of the slanting wall 4 are opposite. The lawn mower blade or other cutting edge placed within the guiding passage 13 is guided by the slanting wall 4 and the adjacent sloping sides 12 of the wings 10, as will be clearly understood. The sharpener 15, two sides of which are at all times presented to the guiding passages 6 and 13, is held in position by means of the set screw 11 which is engaged in the threaded opening provided therefor and extending from the back 2 of the device to the wall 7 to allow the end of the screw to be engaged against the face of the file 15 placed against the wall 7.

When the sharpening member 15 is in position, as illustrated, the convex side is presented to the passage 6 to sharpen the runner of a skate, giving the same a concaved under or cutting face. If it is desired to give the runner a flat, sharp cutting face, the sharpening member is reversed and secured within the slots provided therefor, in the reversed position. This will present the straight or flat cutting face 16 thereof to the passage 6. The sharpening operation may be performed by either reciprocating the sharpening tool or the runner, or both.

When the tool is to be used for sharpening the blades of a lawn mower or similar cutting blades, the implement is held to present the guiding passage 13 to the blade to be sharpened. When the blade is within the guiding passage 13, the implement is moved back and forth, said blade being engaged and sharpened by the file 15.

Thus, it will be seen that the above described sharpening tool may be employed not only by mechanics but with perfect accuracy by the least skilled in the use of such devices. It will also be understood that this sharpener may be employed with equally good effect for sharpening other blades or cutting edges not above mentioned.

What I claim is:

A one piece sharpening implement having a rear side and a front side, an extension upon the rear side, said extension being continued beyond the main portion of the implement and having a slanting wall, wings arranged in alinement with one another, said implement having a guiding passage between the wings and the main portion of the device, said implement having a second guiding passage formed by the slanting wall of the extension and the adjacent sloping edges of the wings, said extension having a file receiving slot communicating with the first mentioned guiding passage and adapted to co-act therewith to hold a sharpening file, and means for holding the file in position.

In testimony whereof I have signed my name to this specification in the presence of two subscribing witnesses.

GEORGE W. GILLESPIE.

Witnesses:
J. C. EDWARDS,
WILLIAM V. LOUIS.

Copies of this patent may be obtained for five cents each, by addressing the "Commissioner of Patents, Washington, D. C."